(No Model.)
E. LAVENS.
CARBON HOLDER FOR ARC LAMPS.
No. 527,864.            Patented Oct. 23, 1894.
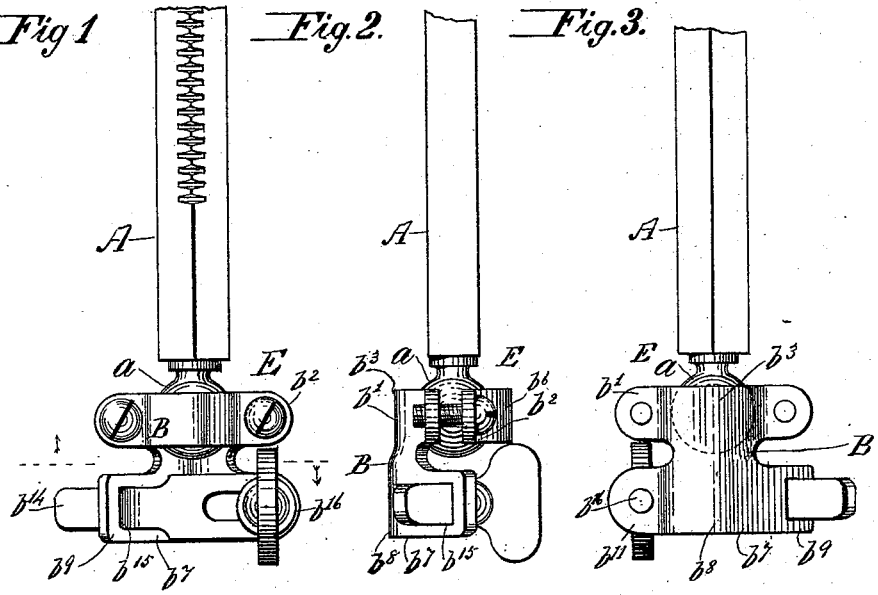
WITNESSES:
J Littlejohn
Wm. A. Pollock
INVENTOR
Erwin Lavens.
BY
Edwin H. Brown
HIS ATTORNEY

UNITED STATES PATENT OFFICE.

ERWIN LAVENS, OF BROOKLYN, ASSIGNOR TO THE GENERAL INCANDESCENT ARC LIGHT COMPANY, OF NEW YORK, N. Y.

CARBON-HOLDER FOR ARC LAMPS.

SPECIFICATION forming part of Letters Patent No. 527,864, dated October 23, 1894.

Application filed March 17, 1894. Serial No. 504,110. (No model.)

*To all whom it may concern:*

Be it known that I, ERWIN LAVENS, of Brooklyn, Kings county, New York, have invented a certain new and useful Improvement in Carbon-Holders for Arc Lamps, of which the following is a specification.

I will describe a carbon holder embodying my improvement, and then point out the novel features in the claims.

In the accompanying drawings Figure 1 is a side view of the lower portion of a rod such as is used for supporting an upper carbon in an ordinary electric arc lamp, and at the lower end of this rod is shown in front elevation a carbon holder embodying my improvement. Fig. 2 is a side view of the rod and carbon holder in a plane at right angles to the plane of Fig. 1. Fig. 3 is a back view of the rod and carbon holder, or, in other words, a view of the opposite side to that which is shown in Fig. 1. Fig. 4 is a horizontal section taken at the plane of the dotted line in Fig. 1, this view being taken from below, or, in other words, looking upward. Fig. 5 is a horizontal section of the same taken at the plane of the dotted line in Fig. 1, but looking downward. Fig. 6 is a face view of one part of the carbon holder.

Similar letters of reference designate corresponding parts in all the figures.

A designates a rod such as is used for supporting the upper carbon of an ordinary electric arc lamp.

B designates a carbon holder attached to the lower end E. The attachment will preferably be by a universal joint. As here shown the joint is made of a ball $a$, which is attached to or formed at the lower end of the rod A, and two plates $b'$ $b^2$ comprised in the carbon holder B. The plate $b'$ has an angular portion $b^3$ in which are formed two spheroidal recesses $b^4$ $b^5$, conforming to the contour of the ball and engaging therewith so as to keep the plate from slipping over the ball. The plate $b^2$ has an angular portion $b^6$ opposite the angular portion $b^3$ of the plate $b'$. The end portions of the plates are secured together in any suitable manner, as, for instance, by screws passing through the plate $b^3$ and engaging with tapped holes in the plate $b'$. By turning these screws, the plates may be made to bear with greater or less pressure upon the ball $a$.

The carbon holder B, is also provided with a plate $b^7$, which is here shown as formed integral with the plate $b'$ but may be otherwise attached to it. It has an angular portion $b^8$, on each side of which are arms $b^9$ $b^{10}$. The arm $b^9$ is shown as extending in a straight line, but the arm $b^{10}$ is shown as being bent so as to have an offset portion or lug $b^{11}$. Opposite the plate $b^7$ is a plate $b^{12}$ having, as here shown, a straight main portion $b^{13}$ and an angular portion $b^{14}$. The angular portion $b^{14}$ passes through a slot $b^{15}$ in the arm $b^9$ of the plate $b^7$. This angular portion may slide in the direction of its length through the said slot. A screw $b^{16}$ passes through a slot formed lengthwise of the straight main portion $b^{13}$ of the plate $b^{12}$ and engages with a tapped hole in the offset portion $b^{11}$ of the arm $b^{10}$ forming part of the plate $b^7$. Around the screw $b^{16}$ between the plate $b^{12}$ and the plate $b^7$, is a coiled spring $b^{17}$.

A carbon is inserted between the plate $b^7$ and the plate $b^{12}$. By turning the screw in one direction or the other, the relation of the plates $b^7$ $b^{12}$ may be adjusted so as to suit any particular size of carbon. The plate $b^{12}$ will slide automatically to adjust itself to any particular size of carbon.

What I claim as my invention, and desire to secure by Letters Patent, is—

1. In a carbon holder, the combination of a plate having an angular portion, another plate also made angular and fitted to the first so as to be capable of sliding lengthwise relatively thereto, and means for adjusting said plates relatively to each other, substantially as specified.

2. In a carbon holder, the combination of a plate having an angular portion, another plate also made angular and fitted to a slot in the first so as to be capable of sliding lengthwise relatively thereto, and means for adjusting said plates relatively to each other, substantially as specified.

3. In a carbon holder, the combination of a plate having an angular portion, another plate also made angular and fitted to the first so as to be capable of sliding lengthwise relatively thereto, and a screw for adjusting the said plates relatively to each other, substantially as specified.

4. In a carbon holder, the combination of a plate having an angular portion, another plate also made angular and fitted to the first so as to be capable of sliding lengthwise relatively thereto, and a screw passing through a slot formed lengthwise on one of the plates and engaging with a tapped hole in the other, for adjusting the said plates relatively to each other, substantially as specified.

5. In a carbon holder, the combination of a plate having an angular portion, another plate also made angular and fitted to the first so as to be capable of sliding lengthwise relatively thereto, a screw passing through a slot formed lengthwise of one of the plates and engaging with a tapped hole in the other plate, and a spring interposed between said plates, substantially as specified.

In testimony whereof I have signed my name to this specification in the presence of two subscribing witnesses.

ERWIN LAVENS.

Witnesses:
HANS SWOBODA,
O. D. STEWART.